(12) United States Patent
Nowka et al.

(10) Patent No.: US 9,346,350 B2
(45) Date of Patent: May 24, 2016

(54) FLUSH AND SUB-FLUSH PROTECTIVE SHIELDS TO REDUCE EXHAUST SOOT AND CONDENSATE DEPOSITION

(71) Applicant: Ford Global Technologies, LLC, Dearborn, MI (US)

(72) Inventors: Erich James Nowka, Ann Arbor, MI (US); Yahong Zhang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/608,852

(22) Filed: Jan. 29, 2015

(65) Prior Publication Data

US 2015/0136515 A1    May 21, 2015

Related U.S. Application Data

(63) Continuation of application No. 13/865,459, filed on Apr. 18, 2013.

(51) Int. Cl.
*B60K 13/04* (2006.01)
*F01N 13/20* (2010.01)
*F01N 13/08* (2010.01)
*F01N 13/18* (2010.01)

(52) U.S. Cl.
CPC .............. *B60K 13/04* (2013.01); *F01N 13/08* (2013.01); *F01N 13/082* (2013.01); *F01N 13/1805* (2013.01); *F01N 13/20* (2013.01)

(58) Field of Classification Search
CPC ..... F01N 13/04; F01N 13/1805; F01N 13/20; B60K 13/04; B60R 19/48
See application file for complete search history.

(56) References Cited

U.S. PATENT DOCUMENTS

| | | | |
|---|---|---|---|
| 2,841,232 A * | 7/1958 | Loeffler | B60K 13/04 180/89.2 |
| 2,850,314 A | 9/1958 | Haigh et al. | |
| 2,854,278 A | 9/1958 | Zerhan, Jr. | |
| 2,856,020 A | 10/1958 | Hoagg et al. | |
| 2,864,406 A | 12/1958 | Schewel | |
| 2,868,229 A | 1/1959 | Russell | |
| 2,919,720 A | 1/1960 | Nicholls | |
| 2,951,724 A | 9/1960 | Morrish et al. | |
| 2,979,357 A * | 4/1961 | Leach | B60R 19/48 180/89.2 |
| 2,992,035 A | 7/1961 | Tell et al. | |
| 3,043,097 A | 10/1961 | Inman | |
| 6,595,318 B2 * | 7/2003 | Ebinger | F01N 13/20 180/309 |
| 6,827,173 B2 * | 12/2004 | Lai | F01N 13/082 180/296 |

(Continued)

FOREIGN PATENT DOCUMENTS

| | | |
|---|---|---|
| DE | 19651608 A1 | 6/1998 |
| DE | 10136350 A1 | 2/2003 |

(Continued)

*Primary Examiner* — Brodie Follman
(74) *Attorney, Agent, or Firm* — Jason Rogers; Price Heneveld LLP

(57) ABSTRACT

An exhaust assembly that includes an exhaust pipe extending rearward from a vehicle into an exhaust passage, and a fascia coupled to the vehicle defining the exhaust passage. The exhaust assembly further includes a bezel defining an exhaust opening substantially aligned with the pipe, and a sleeve configured within the exhaust opening, which may define an exhaust plane. The sleeve extends rearward, flush or sub-flush, with the rearmost portion of the exhaust opening or exhaust plane, and substantially parallel to an exit portion of the pipe.

13 Claims, 9 Drawing Sheets

(56) References Cited

U.S. PATENT DOCUMENTS

| | | | |
|---|---|---|---|
| 6,962,230 B2 | 11/2005 | Hanaya et al. | |
| 7,007,720 B1* | 3/2006 | Chase | F16L 59/12 138/110 |
| 7,032,702 B2* | 4/2006 | Rinklin | B60K 13/04 180/309 |
| D539,716 S | 4/2007 | Kulla | |
| D559,753 S | 1/2008 | Pfeiffer | |
| D584,199 S | 1/2009 | Leclercq | |
| 7,526,358 B2 | 4/2009 | Kawano et al. | |
| 7,558,713 B2 | 7/2009 | Kumar | |
| 7,604,092 B2* | 10/2009 | Fritz | F01N 13/082 180/296 |
| 7,735,885 B2* | 6/2010 | Shin | B60K 13/04 293/113 |
| 7,823,938 B2 | 11/2010 | McKee et al. | |
| 7,874,150 B2* | 1/2011 | Stadler | F01N 13/082 180/309 |
| 7,891,452 B2* | 2/2011 | Iwamoto | F01N 13/082 180/225 |
| 8,312,961 B2* | 11/2012 | Won | F01N 13/20 180/309 |
| 8,443,928 B2 | 5/2013 | Chang | |
| 8,550,122 B2* | 10/2013 | Derry | B21D 39/04 138/108 |
| 8,695,754 B2* | 4/2014 | Iiyama | F01N 13/082 181/227 |
| 8,733,086 B2* | 5/2014 | Han | B60K 13/04 181/221 |
| 8,863,886 B2* | 10/2014 | O'Brien | B60K 13/04 138/110 |
| 8,875,836 B2* | 11/2014 | Park | F01N 13/082 181/227 |
| 2003/0231506 A1* | 12/2003 | Chen | B60Q 1/2688 362/487 |
| 2005/0288807 A1 | 12/2005 | Tooman et al. | |
| 2008/0036222 A1 | 2/2008 | Iwamoto et al. | |
| 2013/0026749 A1* | 1/2013 | O'Brien | B60R 13/0876 285/62 |
| 2014/0311609 A1* | 10/2014 | Nowka | F01N 13/08 138/109 |
| 2014/0316749 A1* | 10/2014 | Zhang | G06F 17/5095 703/1 |
| 2014/0374514 A1* | 12/2014 | Kieslich | F01N 13/082 239/600 |
| 2015/0136515 A1* | 5/2015 | Nowka | B60K 13/04 180/309 |

FOREIGN PATENT DOCUMENTS

| | | |
|---|---|---|
| EP | 2072775 A1 | 6/2009 |
| JP | 07121208 | 5/1995 |
| JP | 2002097947 | 4/2002 |
| JP | 2004239131 | 8/2004 |
| JP | 2006076367 | 3/2006 |
| JP | 2010254256 | 11/2010 |
| JP | 2011025768 | 10/2011 |
| KR | 20100051380 A | 5/2010 |
| KR | 20130043861 A | 5/2013 |

* cited by examiner

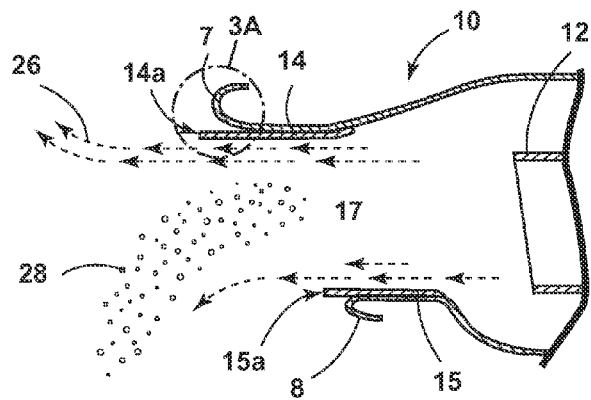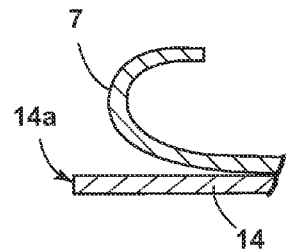
FIG. 3    FIG. 3A
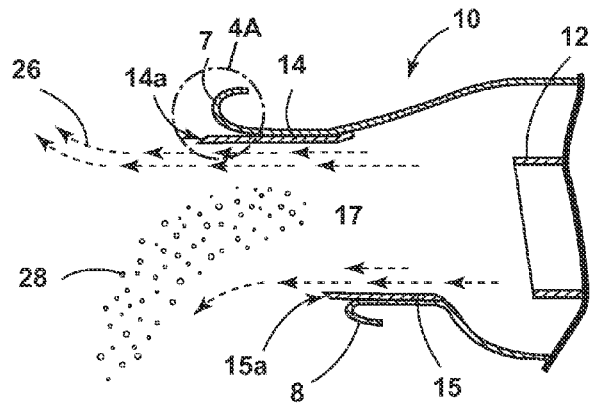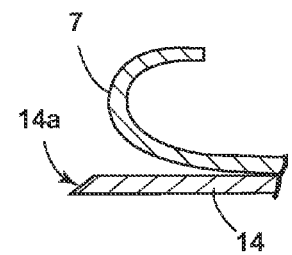
FIG. 4    FIG. 4A
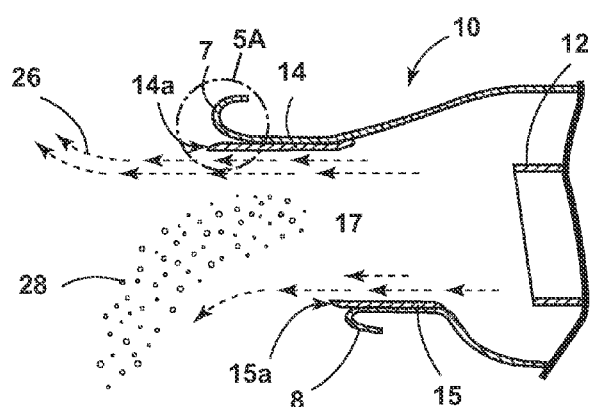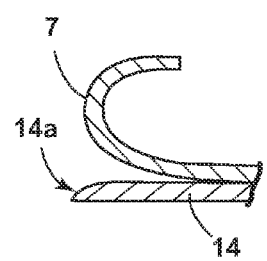
FIG. 5    FIG. 5A

FLUSH AND SUB-FLUSH PROTECTIVE SHIELDS TO REDUCE EXHAUST SOOT AND CONDENSATE DEPOSITION

CROSS-REFERENCE TO RELATED APPLICATION

This application is a continuation-in-part application under 35 U.S.C. §120 of U.S. patent application Ser. No. 13/865,459, filed on Apr. 18, 2013, entitled "PROTECTIVE SHIELD TO REDUCE EXHAUST SOOT AND CONDENSATE DEPOSITION," hereby incorporated by reference in its entirety.

FIELD OF THE INVENTION

The present invention generally relates to exhaust assemblies for vehicular applications and, more particularly, to exhaust assemblies suitable for use in through-fascia, decorative exhaust tip and other vehicular exhaust system designs.

BACKGROUND OF THE INVENTION

Many vehicles currently employ exhaust systems with decorative features in close proximity to the tailpipe and related components. Often these decorative features are curved and in close proximity to exhaust soot and condensate emanating from the tailpipe of vehicles during operation. The exhaust soot and/or condensate often deposits, discolors and otherwise adversely impacts these decorative features. Customer dissatisfaction is one adverse impact associated with these effects.

Vehicles with gasoline direct injection turbocharged (GDTI) engines are particularly prone to this problem. These engines produce high levels of carbon soot due to the level of enrichment required to maintain an acceptable throttle response under wide open throttle conditions. This soot exits the tailpipe as gas-borne and condensate-borne particulate. Both mechanisms of soot contribute to high rates of soot accumulation on the vehicle surfaces in close proximity to the tailpipe, particularly decorative exhaust tips and/or rear fascia. These soot accumulation rates are higher in vehicles with GDTI engines as compared to vehicles with non-GDTI engines.

Accordingly, there is a need for exhaust assemblies that eliminate and/or mitigate the adverse effects associated with soot accumulation, discoloration and the like on the surfaces of a vehicle in proximity to the tailpipe.

SUMMARY OF THE INVENTION

One aspect of the present invention is to provide an exhaust assembly that includes an exhaust pipe extending rearward from a vehicle into an exhaust passage, and a fascia coupled to the vehicle defining the exhaust passage. The exhaust assembly further includes a bezel defining an exhaust opening substantially aligned with the pipe, and a sleeve configured within the exhaust opening. The sleeve extends rearward, flush or sub-flush, with the rearmost portion of the exhaust opening and substantially parallel to an exit portion of the pipe.

Another aspect of the present invention is to provide an exhaust assembly that includes an exhaust pipe with an orifice extending rearward from a vehicle into an exhaust passage, and a fascia coupled to the vehicle defining the exhaust passage. The exhaust assembly further includes a bezel defining an exhaust opening substantially aligned with the orifice, and an upper and a lower sleeve configured within the opening. The opening defines an exhaust plane, and the sleeves extend rearward, flush or sub-flush, with the plane and substantially parallel to the orifice.

A further aspect of the present invention is to provide an exhaust assembly that includes an exhaust pipe extending rearward from a vehicle, and a fascia coupled to the vehicle. The exhaust assembly further includes an upper and a lower bezel coupled to the fascia defining an exhaust opening, and an upper and a lower sleeve configured within the opening substantially aligned with the pipe. The upper sleeve extends rearward and sub-flush with a line tangent to a rearmost surface of the upper bezel and perpendicular to the upper sleeve.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a cross-sectional view of an exhaust assembly with a straight-edged sleeve according to a further embodiment;

FIG. 3A is an enlarged view of the sleeve and bezel regions of the exhaust assembly depicted in FIG. 3;

FIG. 4 is a cross-sectional view of an exhaust assembly with a tapered-edged sleeve according to an additional embodiment;

FIG. 4A is an enlarged view of the sleeve and bezel regions of the exhaust assembly depicted in FIG. 4;

FIG. 5 is a cross-sectional view of an exhaust assembly with a sleeve having an edge rounded to a point according to another embodiment;

FIG. 5A is an enlarged view of the sleeve and bezel regions of the exhaust assembly depicted in FIG. 5;

DETAILED DESCRIPTION OF THE PREFERRED EMBODIMENTS

Figure 1:
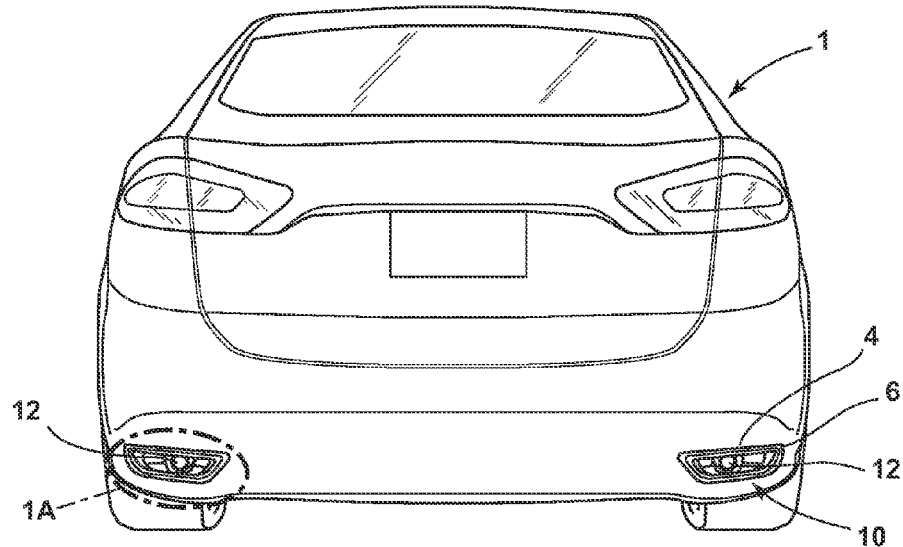
FIG. 1 is a rear, perspective view of a vehicle with an exhaust assembly with a trapezoidal shaped bezel and sleeve according to one embodiment.
Figure 1A:
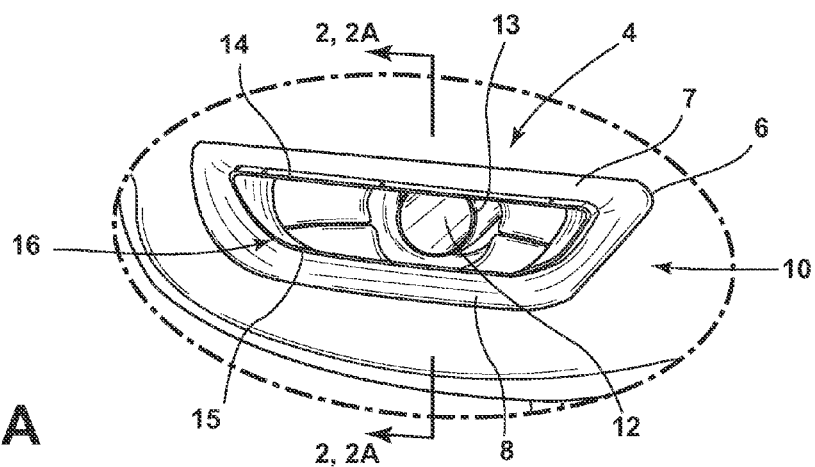
FIG. 1A is an enlarged view of the exhaust assembly depicted in FIG. 1.
Figure 6:
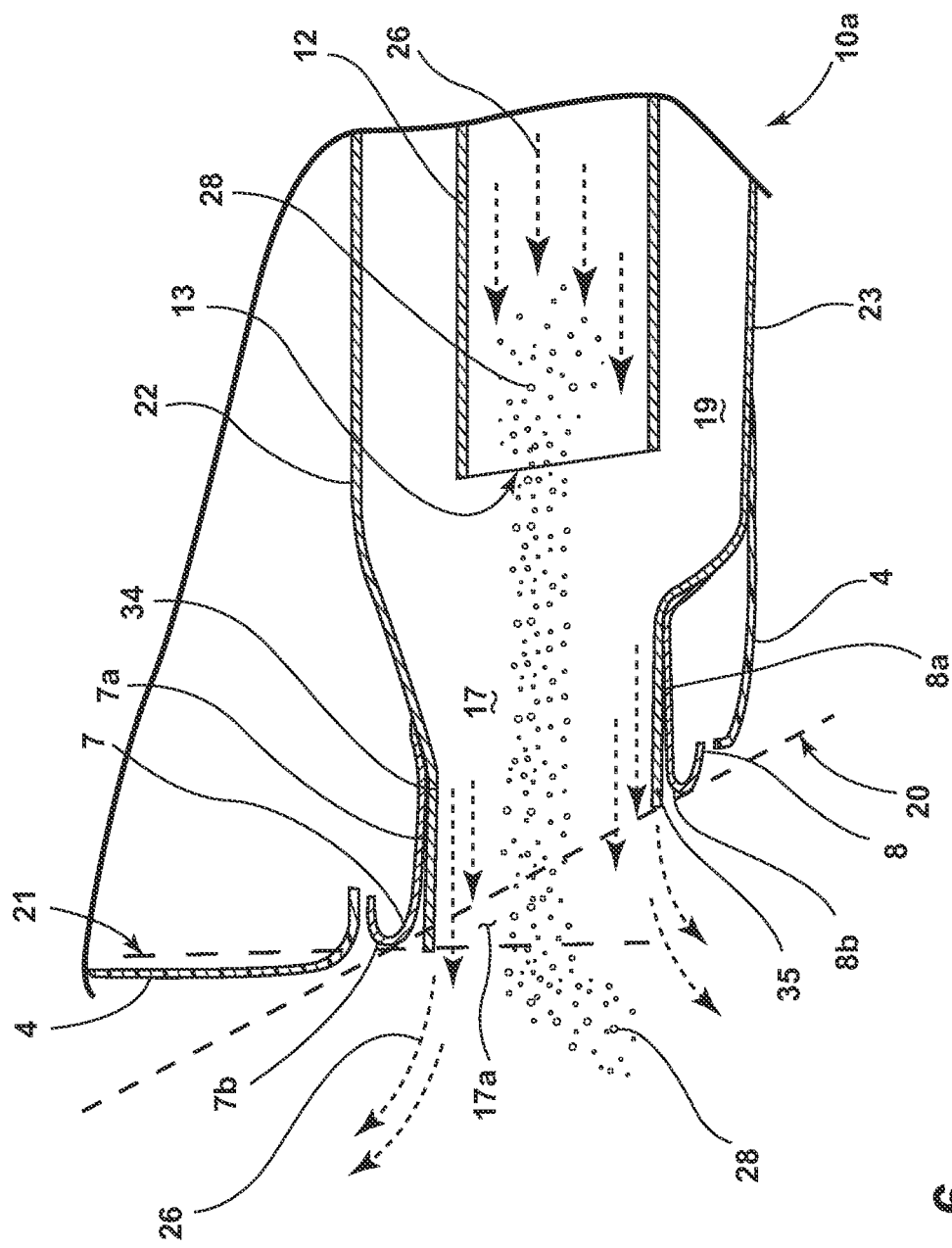
FIG. 6 is a cross-sectional view of an exhaust assembly, an integrated sleeve and heat shield according to a further embodiment.
Figure 6A:
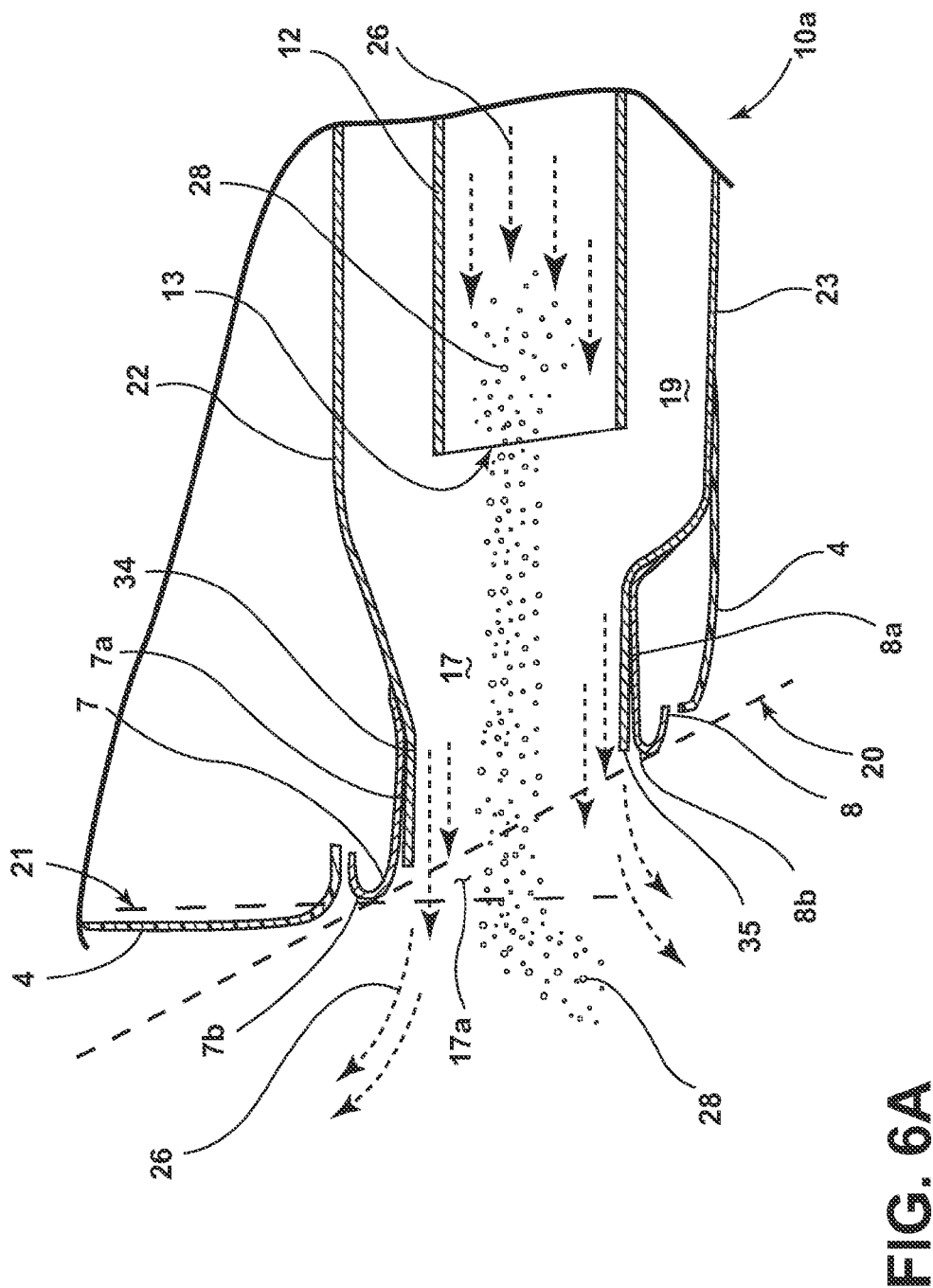
FIG. 6A is a cross-sectional view of an exhaust assembly, an integrated sleeve and heat shield according to an another embodiment.
Figure 7:
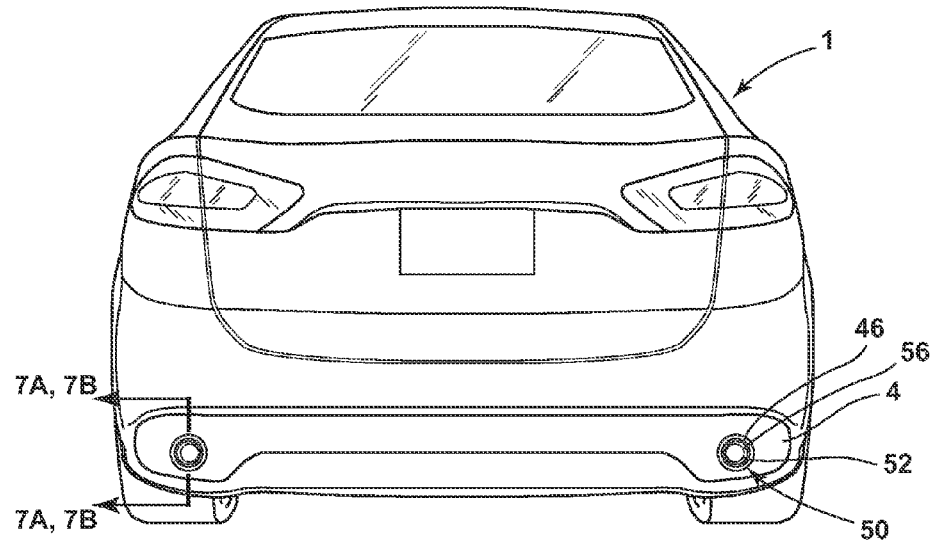
FIG. 7 is a rear, perspective view of a vehicle with a decorative exhaust tip assembly according to an additional embodiment.

For purposes of description herein, the terms "upper," "lower," "right," "left," "rear," "front," "vertical," "horizontal," and derivatives thereof shall relate to the invention as oriented in FIGS. 1, 1A and 7. Further, the terms "forward," and "rearward," shall relate to the invention as oriented in FIGS. 2-6A, 7A and 7B relative to the forward and rearward directions associated with a vehicle, respectively. However, the invention may assume various alternative orientations, except where expressly specified to the contrary. Also, the specific devices illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Various exhaust assemblies are employed today to practical effect in directing noxious exhaust constituents away from the vehicle and its occupants during operation. But these assemblies tend to cause accumulation of soot on the rear, exterior surfaces of the vehicle, particularly in those vehicles with GDTI engines and through-fascia or decorative exhaust tip designs. Merely projecting the tailpipe farther away from these surfaces can minimally address the problem, but favorable results are only obtained with significant extensions of the tailpipe away from the vehicle fascia, for example. Unfortunately, it is not aesthetically pleasing to many consumers to move the tailpipe of the vehicle significantly rearward from the fascia, bumper and other rear vehicle components. Further, moving the tailpipe rearward in this fashion adds length to the vehicle, making parking more difficult. Still further, federal regulations aimed at pedestrian safety can limit the extent to which a vehicle designer can move the tailpipe away from the rear components of the vehicle.

Certain mechanisms drive soot accumulation on the exterior surfaces of the vehicle in proximity to the tailpipe (or tailpipes) connected to the vehicle exhaust system. Exhaust that emanates from the vehicle in the rearward direction tends to follow the exterior surfaces of the vehicle, particularly curved surfaces in proximity to the tailpipe. This mechanism is associated with the Coandă effect—i.e., the tendency of fluid jets to be attracted to nearby surfaces. Airflow tends to be bent toward nearby surfaces according to the Coandă effect. Consequently, exhaust flow, and particularly gas-borne and condensate-borne soot, tends to be bent toward nearby exterior surfaces of the vehicle. In turn, this effect leads to the accumulation of unwanted soot on these surfaces. Consequently, vehicles with decorative fascia and decorative exhaust tips are particularly prone to these effects.

It is now understood that straight surfaces along the exhaust path in proximity to curved rear vehicle features (e.g., fascia) tend to break up the exhaust flow, thereby shielding the exterior curved surfaces from soot accumulation. In effect, shielding elements placed inside of an exhaust opening can cause the exhaust flow gases to be dragged by shearing forces along the surfaces defined by these elements, away from the curved exterior surfaces of the vehicle. As a result, soot accumulation is significantly reduced on these surfaces.

Referring to FIG. 1, an exhaust assembly 10 is depicted as mounted on the rear portion of vehicle 1 according to an embodiment. Assembly 10 is configured according to the foregoing principles to mitigate Coandă-related soot accumulation effects on the rear exterior surfaces of the vehicle 1. The assembly 10 includes rear fascia 4 coupled to the vehicle 1 in proximity to a rear bumper (not shown). Exhaust assembly 10 also includes an exhaust pipe 12 extending rearward from vehicle 1. The exhaust assembly 10 further includes a bezel 6 located within the fascia 4, and that is substantially aligned with the exhaust pipe 12.

Figure 2:
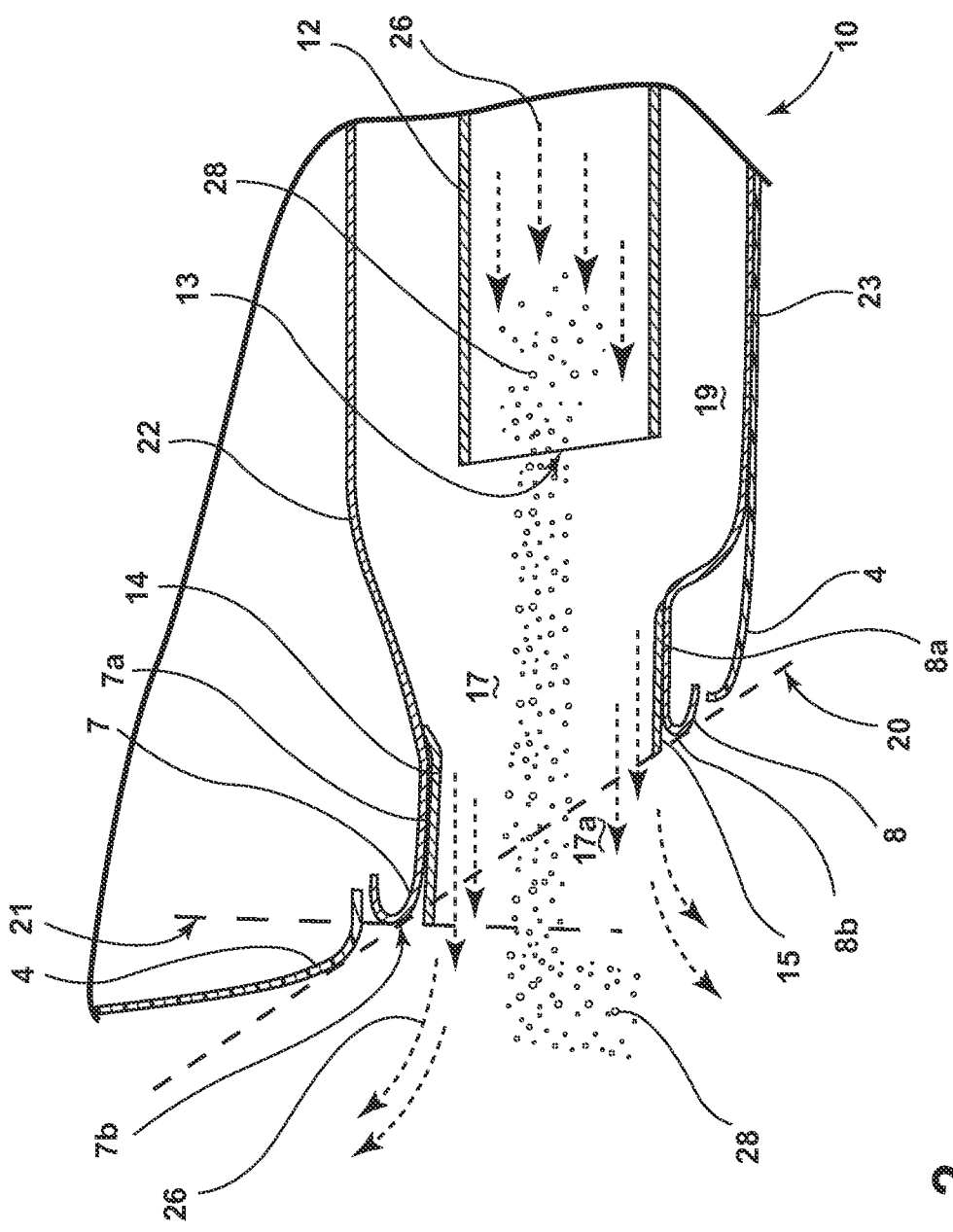
FIG. 2 is a cross-sectional view of an exhaust assembly with a bezel and a sleeve according to another embodiment.
Figure 2A:
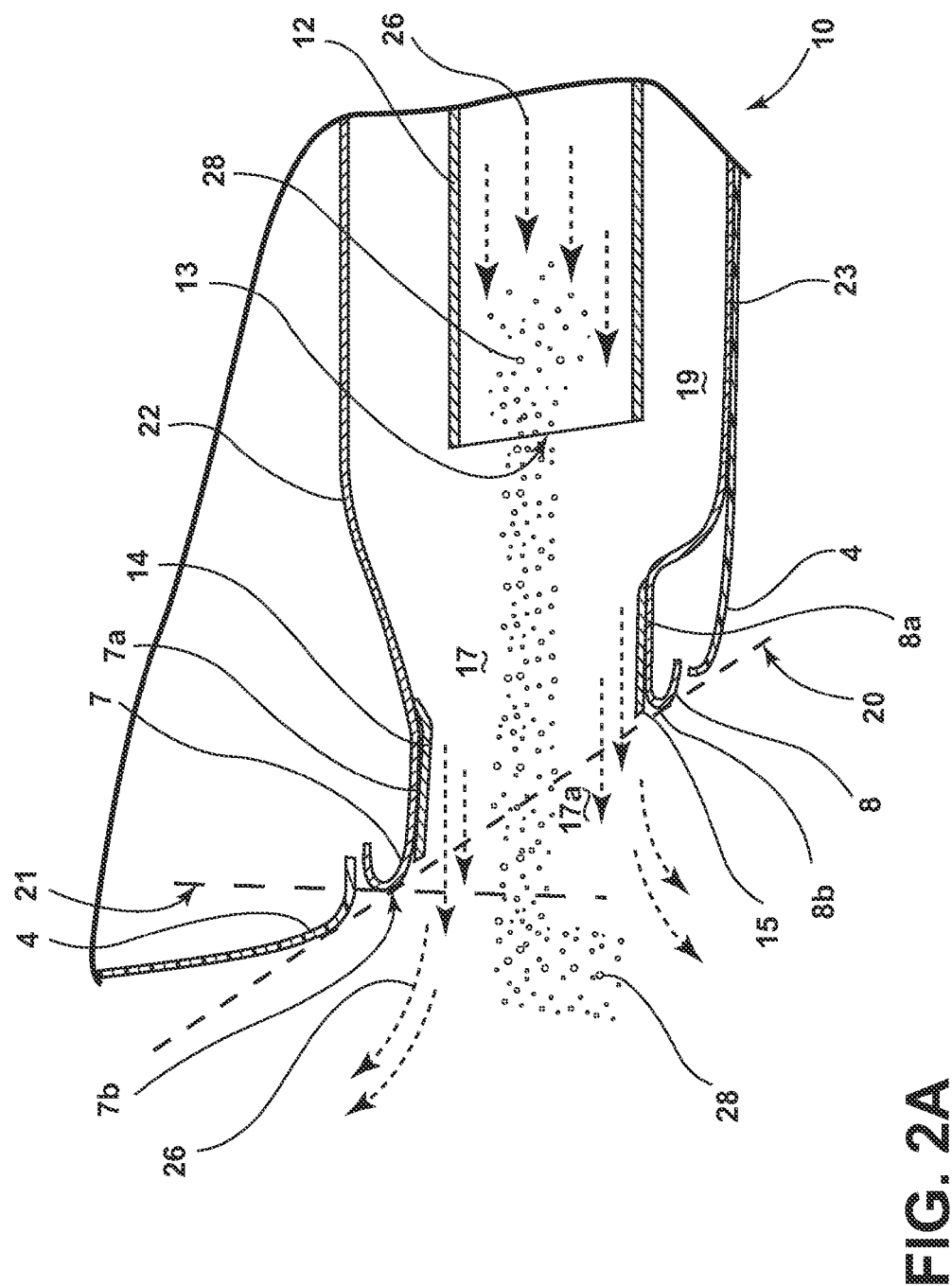
FIG. 2A is a cross-sectional view of an exhaust assembly with a bezel and a sleeve according to an additional embodiment.

To further illustrate the foregoing principles and aspects, a cross-section of an exhaust assembly 10 is depicted in FIG. 2 (see also FIG. 2A). Exhaust pipe 12 extends in the rearward direction toward the left side of FIG. 2 into an exhaust passage 19. The pipe 12 defines an exit portion 13. Exit portion 13 may be in the form of an orifice or other opening substantially parallel to the primary longitudinal axis of pipe 12. Exhaust gas 26 and exhaust condensate 28, both containing soot, emanate from the pipe 12 as shown. The exhaust gas 26 and condensate 28 both continue to flow in the rearward direction through exhaust passage 19, exiting the vehicle 1 (not shown). Exhaust passage 19 is roughly defined by fascia 4 and further includes an exhaust opening 17. The gas 26 and condensate 28 flow through the opening 17 during operation of the vehicle 1.

The exhaust assembly 10, as depicted in FIG. 2 (see also FIG. 2A), manages and directs the flow of exhaust gas 26 and exhaust condensate 28 to minimize accumulation of soot on exterior surfaces of the vehicle 1 (not shown), such as fascia 4. The bezel 6 (see FIG. 1) of assembly 10 is divided into an upper bezel 7 and lower bezel 8 (FIG. 2). Upper bezel 7 and lower bezel 8 define the exhaust opening 17, substantially aligned with exhaust pipe 12 and the exit portion of the pipe 13. Further, upper bezel 7 and lower bezel 8 may be coupled to vehicle 1 by a variety of means, such as upper heat shield 22 and lower heat shield 23. As shown in FIG. 2, upper bezel 7 is integral with upper heat shield 22; however, upper bezel 7 may be welded, riveted or otherwise connected to shield 22 as a separate piece. Similarly, lower bezel 8 is shown integral with lower heat shield 23, but may also be welded, riveted, or otherwise connected to it as a separate piece. It should also be apparent that bezel 6 may be formed in a unibody construction, without upper and lower elements.

Exhaust assembly 10 further includes a sleeve 16 (see FIG. 1A) that can comprise upper sleeve 14 and lower sleeve 15 portions, all located within exhaust opening 17 (see FIGS. 2 and 2A). The sleeve 16 can be coupled to the bezel 6 (see FIG. 1A) and, more particularly, the upper sleeve 14 and lower sleeve 15 can be coupled to the upper and lower bezels 7 and 8, respectively (FIGS. 2 and 2A). This coupling, e.g., between the bezel 6 and sleeve 16 (FIG. 1A), can be accomplished through welding, interference fits, riveting, or other attachment methods as understood by those skilled in the field. As further depicted in FIG. 2, the upper sleeve 14 and lower sleeve 15 each extend rearward to at least the rearmost portion of the exhaust opening 17a. In some aspects of the exhaust assembly 10, as shown in FIG. 2A, the upper sleeve 14 and lower sleeve 15 can each extend rearward, flush or sub-flush with the rearmost portion of the exhaust opening 17a. In these aspects, the upper and lower sleeves 14 and 15 are flush or sub-flush (i.e., vehicle-forward) with regard to the exhaust opening 17a. Preferably, the upper and lower sleeves 14 and 15 remain in relatively close proximity (e.g., within 10 cm or less) to the exhaust opening 17a, however, even if vehicle-forward from the opening 17a. In certain exemplary aspects, the upper and lower sleeves 14 and 15 are set sub-flush about 1 to 5 mm with regard to the exhaust opening 17a.

As also depicted in FIG. 2 (see also FIG. 2A), upper bezel 7 and lower bezel 8 each may include curved, rearmost surfaces 7b and 8b, respectively, which define the rearmost portion of exhaust opening 17a. Further, upper sleeve 14 and lower sleeve 15 extend substantially parallel to the exit portion of the pipe 13. It is these upper and lower sleeves 14 and 15 that minimize the Coandă effect, thereby directing exhaust gas 26 and exhaust condensate 28 away from the fascia 4, upper bezel 7 and lower bezel 8.

According to another embodiment, the exhaust assembly 10 can be configured such that exhaust opening 17 includes an exhaust opening plane 20 (see FIG. 2). Exhaust opening plane 20 can be arranged and defined such that it is tangent to the rearmost surfaces 7b and 8b of the upper and lower bezels 7 and 8. It is also conceivable that opening plane 20 is configured tangent to other, rearmost exterior surfaces of the vehicle, including rearmost surfaces of the fascia 4, for example (not shown). The upper sleeve 14 and lower sleeve 15 can thus extend rearward to at least the exhaust opening plane 20 as further shown in FIG. 2. This relationship ensures that the lower and upper sleeve 14 and 15 each extend at least slightly past the rearmost surfaces 7b and 8b of the upper and lower bezels 7 and 8, respectively. Consequently, exhaust gas 26 and exhaust condensate 28 are directed away from these surfaces by the sleeves 14 and 15, thus minimizing the Coandă effect and mitigating unwanted soot deposition.

In another aspect of the exhaust assembly 10, as shown in FIG. 2A, the upper sleeve 14 and the lower sleeve 15 can extend rearward, flush or sub-flush with the exhaust opening plane 20. This relationship ensures that the lower and upper sleeve 14 and 15 each extend sub-flush (i.e., vehicle-forward) in proximity to or flush with the opening plane 20. In certain exemplary aspects, the upper and lower sleeves 14 and 15 are set sub-flush about 1 to 5 mm with regard to the exhaust opening plane 20. Consequently, the upper and lower sleeves 14 and 15 can extend in proximity to or up to the rearmost surfaces 7b and 8b of the upper and lower bezels 7 and 8, respectively. Exhaust gas 26 and exhaust condensate 28 are thus directed away from these surfaces by the upper and lower sleeves 14 and 15 according to the aspect of the exhaust assembly 10 depicted in FIG. 2A, thus minimizing the Coandă effect and mitigating unwanted soot deposition.

As also shown in FIGS. 2 and 2A, exhaust assembly 10 can also be configured such that the upper and lower sleeves 14 and 15 extend substantially parallel to the exit portion of the exhaust pipe 13 and tangentially to the upper and lower bezels 7 and 8. In particular, upper bezel 7 and lower bezel 8 may each comprise inner surfaces 7a and 8a, respectively. These surfaces 7a and 8a are arranged substantially parallel to the exit portion of the exhaust pipe 13. Thus, the upper and lower sleeves 14 and 15 are arranged tangentially to these surfaces 7a and 8a. With this particular configuration of exhaust assembly 10, the sleeves 14 and 15 are configured to maximize a straight exit path for exhaust gas 26 and condensate 28, emanating from pipe 12. The net effect is a further reduction in the Coandă effect, thereby reducing soot accumulation on the fascia 4 and bezel 6 surfaces.

Exhaust assembly 10 may also be particularly configured to minimize the effects of soot deposition from condensate 28 on the exterior surfaces of the vehicle 1, e.g., fascia 4 and bezel 6. As shown in FIGS. 2 and 2A, exhaust assembly 10 can be configured such that its upper portions, e.g., upper sleeve 14 and/or upper bezel 7, are located rearward relative to its lower portions, e.g., lower sleeve 15 and/or lower bezel 8. That is, the upper sleeve 15 can be positioned such that its rearmost edge is rearward of the rearmost edge of lower sleeve 14. This positional relationship has the effect of increasing the distance between condensate 28 emanating from the exit opening 17 and rear surfaces of the vehicle, e.g.,
rear surfaces of the fascia 4, lower than assembly 10. This is because condensate 28 is generally heavier than air and tends to drop toward the ground by gravity during operation of the vehicle 1 (see FIG. 1) under typical engine running speeds and condensate flow velocities.

In another embodiment, exhaust assembly 10 may also be particularly configured to minimize Coandă effects through positional control of the upper sleeve 14 relative to the upper bezel 7. In certain vehicle configurations and at certain vehicle velocities, the upper bezel 7 and upper elements of fascia 4 (not shown) are particularly prone to Coandă effects as they may have significantly more surface area than comparable lower bezel 8 and lower elements of fascia 4, respectively. As shown in FIG. 2, an upper sleeve tangent line 21 can be configured such that it is drawn tangent to the rearmost surfaces of upper bezel 7b and perpendicular to upper sleeve 14. Upper sleeve 14 can then be configured such that it extends rearward to at least tangent line 21. By utilizing this arrangement with tangent line 21, exhaust assembly 10 can ensure that upper sleeve 14 is provided with sufficient clearance from upper bezel 7 and upper elements (not shown) of fascia 4.

In a further aspect, as depicted in FIG. 2A, the exhaust assembly 10 can be configured to minimize Coandă effects through other positional controls of the upper sleeve 14 relative to the upper bezel 7. As shown in FIG. 2A, an upper sleeve tangent line 21 can be configured such that it is drawn tangent to the rearmost surfaces of upper bezel 7b and perpendicular to upper sleeve 14. Upper sleeve 14 can then be configured such that it extends rearward, sub-flush (i.e., vehicle-forward) with the tangent line 21. That is, the upper sleeve 14 can be configured such that it is in proximity to the tangent line 21, but vehicle-forward from it. In certain exemplary aspects, the upper sleeve 14 can be set sub-flush about 1 to 5 mm with regard to the tangent line 21. By utilizing these arrangements with tangent line 21, the exhaust assembly 10 depicted in FIG. 2A can ensure that upper sleeve 14 is provided with sufficient clearance from upper bezel 7 and upper elements (not shown) of fascia 4.

The foregoing configurations of exhaust assembly 10 that depend on exhaust plane 20 and/or tangent line 21 are used to ensure the rearward positional location of sleeve 16, upper sleeve 14 and/or lower sleeve 15 relative to the rearmost curved surfaces of the vehicle 1 (e.g., fascia 4, rearmost surfaces 7b and 8b of bezel 6, etc.). As such, assembly 10 should be configured to ensure that the sleeve 16 (see FIGS. 1 and 1A) can direct and/or shear the exhaust gas 26 and exhaust condensate 28 away from these surfaces to minimize Coandă effects. It should also be understood that other relationships between the sleeve 16 and rear components of vehicle 1 similar to those described in connection with exhaust plane 20 and tangent line 21 can be employed with the same or similar results.

The various components associated with exhaust assembly 10 can be fabricated from materials as understood in the art. For example, exhaust pipe 12 can be made from various steel alloys with sufficient corrosion resistance and mechanical properties for the application. The fascia 4, bezel 6 and sleeve 16 can also be made from polymers, metals and composites suitable for their intended application. The interior surfaces of sleeve 16 can be configured with high smoothness and uniformity to improve exhaust gas 26 and condensate flow 28 through opening 17 thereby minimizing the deposition of soot on the surfaces of the sleeve 16.

Figure 1B:
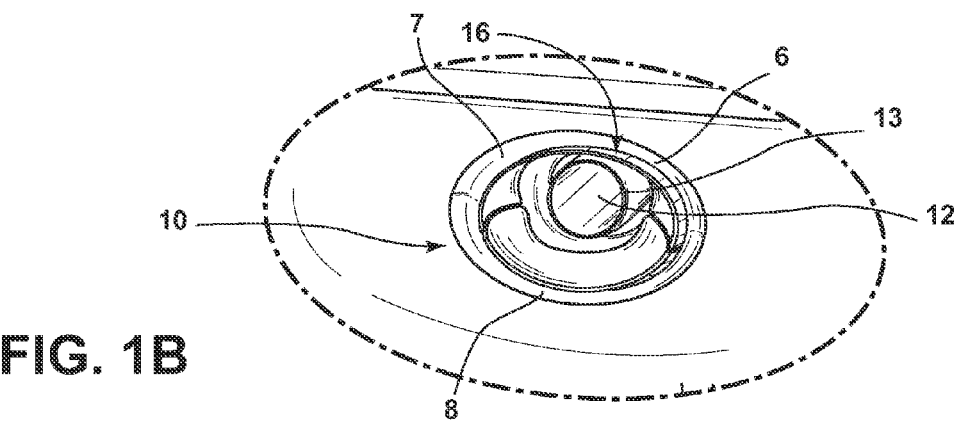
FIG. 1B is an enlarged view of an exhaust assembly with a circularly shaped bezel and sleeve installed in the vehicle depicted in FIG. 1 according to another embodiment.

As shown in FIGS. 1A & 1B, exhaust assembly 10 can be arranged such that sleeve 16, and/or upper and lower sleeve portions 14 and 15 take on substantially trapezoidal (FIG.

1A), substantially cylindrical (FIG. 1B) or other shapes. There are numerous possible shapes of sleeve 16 that can be created to match particular designs associated with fascia 4, bezel 6, upper bezel 7 and/or lower bezel 8. It can be beneficial to ensure that the foregoing relationships between the sleeve 16 and the bezel 6, upper bezel 7, lower bezel 8 and/or fascia 4 are maintained along a substantial portion of the periphery of these elements. As such, the sleeve 16, upper and lower sleeve portions 14 and 15 are preferably continuous within the fascia 4 and bezel 6 elements as shown in FIGS. 1A and 1B. Sleeve 16, and/or upper sleeve 14 and lower sleeve 15, are also preferably configured in a continuous shape within exhaust opening 17 (see FIGS. 1A, 1B, 2 and 2A).

As shown in FIGS. 3-5A, the Coandă effect reductions associated with exhaust assembly 10 according to the foregoing aspects (see, e.g., FIGS. 2 and 2A) can also be improved by the control of the shape of the edges 14a and 15a of the rearmost portion of the upper and lower sleeve portions 14 and 15, respectively. In FIGS. 3 and 3A, the edges 14a and 15a are characterized by straight edges substantially perpendicular to the flow of exhaust gas 26 and exhaust condensate 28. In FIGS. 4 and 4A, edges 14a and 15a possess a tapered edge toward the upper bezel 7 and lower bezel 8, away from the flow of exhaust gas 26 and exhaust condensate 28. As such, edges 14a and 15a shown in FIGS. 4 and 4A are substantially tapered to a point. Referring to FIGS. 5 and 5A, the edges 14a and 15a are curved to a point, away from the flow of gas 26 and condensate 28. Each of these configurations tend to improve the flow of gas 26 and condensate 28 from pipe 12 through opening 17 such that the flow stream moves away from exterior surfaces of the vehicle 1 (see FIG. 1), such as upper bezel 7 and lower bezel 8 (see FIGS. 3-5). Other shapes of edges 14a and 15a are feasible, provided that they are characterized by a discontinuous edge feature, preferably a sharp edge or edges, in the rearward direction.

It should also be apparent that manufacturing limitations and/or handling-related concerns can dictate the need to impart some slight roundness and/or additional facets to edges 14a and 15a. It is also possible to taper or curve edges 14a and 15a toward the flow of gas 26 and exhaust condensate 28 (not shown). Such a configuration will significantly improve the flow of gas 26 and condensate 28 away from the exterior surfaces of vehicle 1, but is less preferred than the configurations depicted in FIGS. 3-5A.

As shown in FIGS. 6 and 6A, exhaust assembly 10a may be configured such that it possesses a sleeve 16 (see, e.g., FIG. 1) integral with the upper and lower heat shield 22 and 23. Exhaust assembly 10a includes an integrated upper sleeve 34 that is integral with upper heat shield 22. Similarly, integrated lower sleeve 35 is integral with lower heat shield 23. The upper and lower bezels 7 and 8 are then coupled or otherwise attached to the upper and lower sleeve elements 34 and 35. Further, upper and lower sleeves 34 and 35 are configured in the rearward direction, past, flush or sub-flush with the exhaust opening 17a, exhaust plane 20 and/or tangent line 21 elements as depicted in FIGS. 6 and 6a. In certain exemplary aspects, the upper and lower sleeves 34 and 35 can be set sub-flush about 1 to 5 mm with regard to the exhaust opening 17a, exhaust plane 20 and/or tangent line 21 elements. Compared to the respective exhaust assemblies 10 depicted in FIGS. 2 and 2A, the respective exhaust assemblies 10a depicted in FIGS. 6 and 6A can be simpler to manufacture as the sleeve is integral with the heat shield in these designs. They also have the benefit of providing a smooth set of inner surfaces defining exhaust passage 19, assisting in the movement of gas 26 and condensate 28 through opening 17. In all other respects, the exhaust assemblies 10a are configured comparably to exhaust assemblies 10 described and depicted in the foregoing.

Figure 7A:
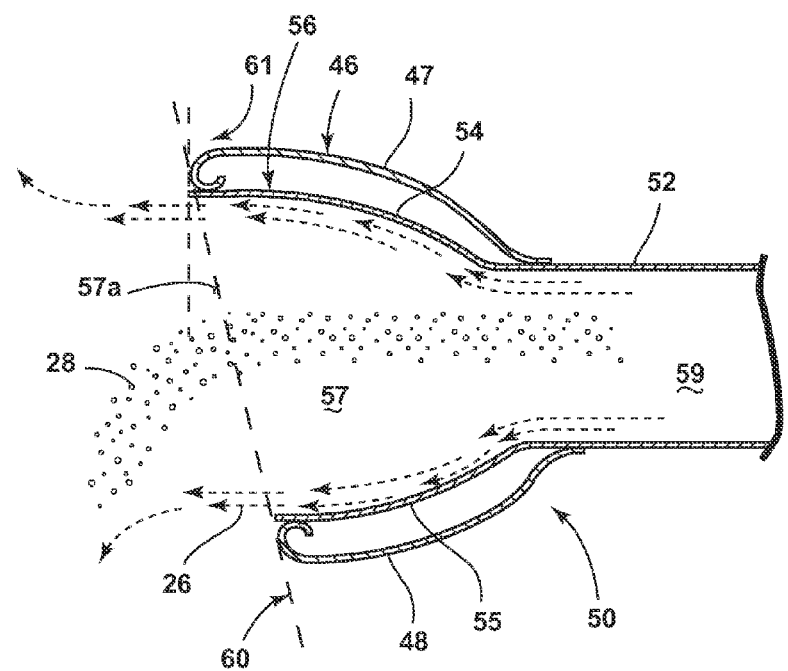
FIG. 7A is a cross-sectional view of the decorative exhaust tip assembly depicted in FIG. 7.
Figure 7B:
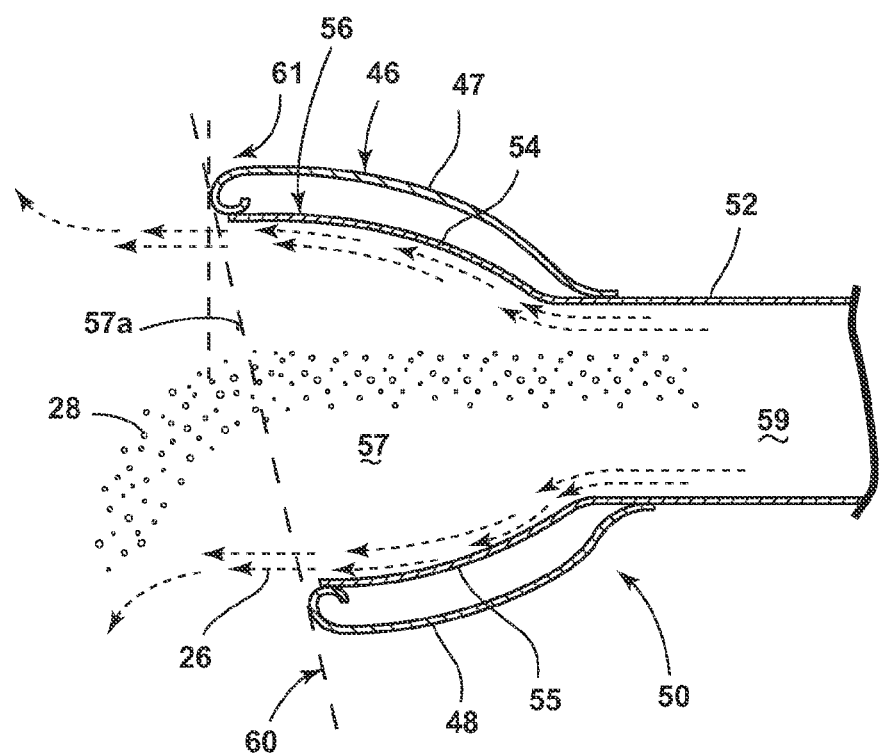
FIG. 7B is a cross-sectional view of another embodiment of the decorative exhaust tip assembly depicted in FIG. 7.

As shown in FIGS. 7, 7A and 7B, the foregoing principles and aspects can be applied to an exhaust tip assembly 50 configured within the fascia 4 of vehicle 1 (see FIG. 1). Here, the exhaust tip assembly 50 includes an exhaust pipe 52 extending in a rearward direction from vehicle 1. The exhaust tip assembly 50 also includes a decorative exhaust tip 46 with upper tip 47 and lower tip 48 portions, and a sleeve 56 having upper and lower sleeve elements 54 and 55. The upper and lower exhaust tip portions 47 and 48 can be characterized by curved rearmost surfaces.

Adjacent and coupled to tip portions 47 and 48 are upper and lower sleeve elements 54 and 55, integral with the exhaust pipe 52, as shown in FIGS. 7, 7A and 7B. Sleeve elements 54 and 55 extend rearward and their rearmost portions are substantially parallel to the walls of exhaust pipe 52. Together, upper and lower sleeve elements 54 and 55, along with pipe 52, define an exhaust opening 57. Further, the rearmost portion 57a of the exhaust opening 57 is defined by the rearmost surfaces of tips 47 and 48.

As shown in FIG. 7A, upper and lower sleeve elements 54 and 55 extend at least to the rearmost portion 57a of the exhaust opening 57. Similarly, the upper and lower sleeve elements 54 and 55 of the exhaust tip assembly 50 depicted in FIG. 7B extend rearward, flush or sub-flush with the rearmost portion 57a of the exhaust opening 57. In certain exemplary aspects, the upper sleeve 54 and 55 can be set sub-flush about 1 to 5 mm with regard to the exhaust opening 57. These configurations ensure that the sleeve elements 54 and 55 can cooperate in directing exhaust gas 26 and condensate 28 away from the rearmost surfaces of decorative exhaust tip 46, thus mitigating Coandă effects.

As depicted in FIG. 7A, exhaust tip assembly 50 may also be configured such that upper and lower sleeve elements 54 and 55 extend rearward at least to exhaust opening plane 60 and/or upper sleeve tangent line 61. Likewise, the exhaust tip assembly 50 depicted in FIG. 7B can be configured such that the upper and lower sleeve elements 54 and 55 extend rearward, flush or sub-flush with the exhaust opening plane 60 and/or upper sleeve tangent line 61. In certain exemplary aspects, the upper sleeve 54 and 55 can be set sub-flush about 1 to 5 mm with regard to the exhaust opening 60 and/or upper sleeve tangent line 61. Exhaust opening plane 60 is defined by a plane tangent to the rearmost surfaces of upper and lower tip portions 47 and 48. Upper sleeve tangent line 61 is defined as the line or lines tangent to the upper tip portion 47 and perpendicular to the rearmost edges of upper sleeve element 54. As such, exhaust tip assembly 50 relies on sleeve elements 54 and 55 in a similar fashion as exhaust assemblies 10 and 10a rely on sleeve 16, along with upper and lower sleeves 14 and 15.

It should thus be understood that exhaust assemblies 10, 10a and 50 described in the foregoing and depicted in FIGS. 1-7B are exemplary of the systems that can be used to mitigate or eliminate Coandă effects related to soot accumulation on the exterior surfaces of vehicles. Other configurations are possible, depending on the arrangement of the exhaust pipe 12 relative to the rear, exterior components of vehicle 1.

Figure 8:
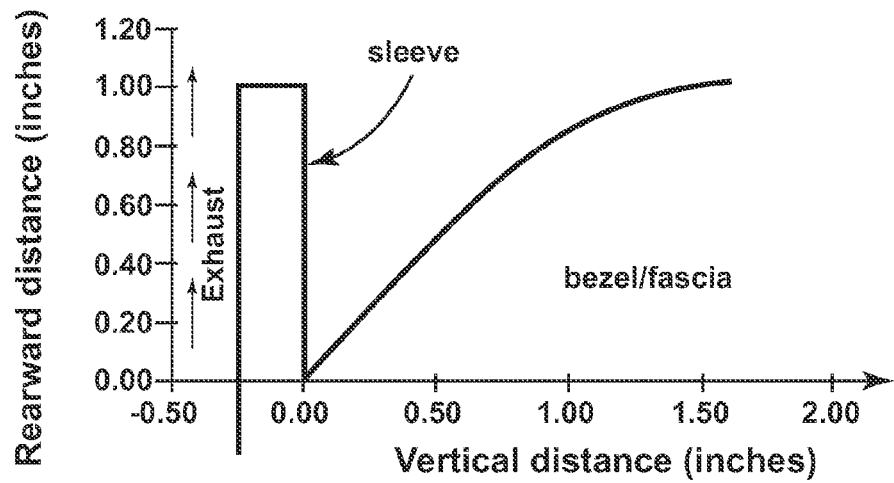
FIG. 8 is a cross-sectional schematic of the contour of a sleeve and bezel/fascia in the rearward and vertical directions according to a further embodiment.
Figure 8A:
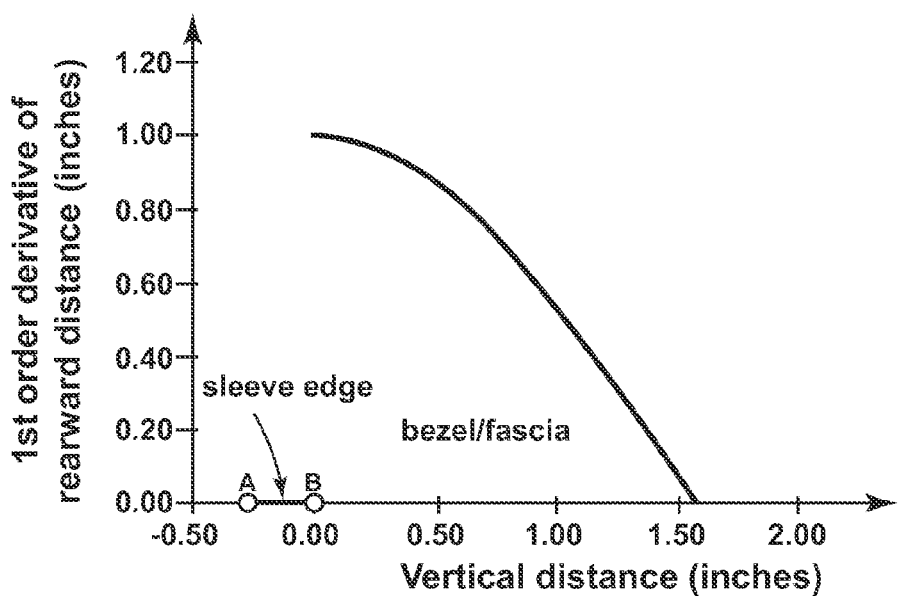
FIG. 8A is a schematic of the first order derivative of the contour of the sleeve and bezel/fascia depicted in FIG. 8.

Further, other relationships may be used to configure and position the sleeves 16, 56 or the like within such exhaust assemblies used in vehicles. As depicted in FIGS. 8 and 8A, for example, a sharp edge feature can be ensured on the rearmost portion of sleeves 16, 56 or the like by the employment of particular mathematical relationships. FIG. 8 schematically depicts the contour of a sleeve (e.g., sleeve 16, 56)

and bezel (e.g., bezel 6)/fascia (e.g., fascia 4) in the rearward and vertical directions according to a further embodiment. The rearmost edge of the sleeve is characterized by a straight edge comparable to the edges 14*a* and 15*a* depicted in FIGS. 3 and 3A. The cross-sectional outline of the sleeve and bezel interacts with the exhaust gas flow stream as shown in FIG. 8. In FIG. 8, the y-axis corresponds to the rearward direction and the x-axis corresponds to the vertical direction relative to the ground. The first order derivatives (dy/dx) of these features are depicted in FIG. 8A. In the interval between Point A and Point B, the cross-sectional outline of the sleeve (e.g., sleeve 16, 56; see FIG. 8) is differentiable and its first order derivative is zero. However, the first order derivative at Point A, and at Point B, approaches infinity (i.e., the rearward distance increases while the vertical distance is unchanged), as denoted in FIG. 8A by the closed-circle symbols beneath Points A and B. A first order derivative that approaches infinity can demonstrate the presence of a discontinuous edge feature associated with a sleeve 16, 56, a characteristic that is particularly beneficial in reducing or eliminating Coandă effects associated with the flow of exhaust gas 26 and condensate 28.

Certain recitations contained herein refer to a component being "configured" in a particular way. In this respect, such recitations are structural recitations as opposed to recitations of intended use. More specifically, the references herein to the manner in which a component is "configured" denotes an existing physical condition of the component and, as such, is to be taken as a definite recitation of the structural characteristics of the component.

Variations and modifications can be made to the aforementioned structure without departing from the concepts of the present invention. Further, such concepts are intended to be covered by the following claims unless these claims by their language expressly state otherwise.

What is claimed is:

1. An exhaust assembly, comprising:
    an exhaust pipe extending rearward from a vehicle into an exhaust passage;
    a fascia coupled to the vehicle defining the exhaust passage;
    a bezel comprising curved surfaces having a rearmost portion and inner surfaces substantially parallel to an exit portion of the pipe, the bezel defining an exhaust opening substantially aligned with the pipe that comprises an exhaust opening plane tangent to the rearmost portion of the curved surfaces of the bezel; and
    a sleeve configured within the exhaust opening,
    wherein the sleeve extends tangent to the inner surfaces of the bezel and rearward, flush or sub-flush, with a rearmost portion of the exhaust opening and the exhaust opening plane, and substantially parallel to the exit portion of the pipe.

2. The exhaust assembly according to claim 1, wherein the sleeve is further configured in a substantially cylindrical shape within the exhaust opening.

3. The exhaust assembly according to claim 1, wherein the rearmost portion of the sleeve has non-rounded edges.

4. The exhaust assembly according to claim 1, wherein the sleeve is integral with a heat shield surrounding the exhaust pipe.

5. An exhaust assembly, comprising:
    an exhaust pipe with an orifice extending rearward from a vehicle into an exhaust passage;
    a fascia coupled to the vehicle defining the exhaust passage;
    a bezel defining an exhaust opening substantially aligned with the orifice and comprising an upper and a lower bezel portion having curved surfaces with a rearmost portion that, together, define an exhaust plane tangent to the rearmost portion of the curved surfaces of the bezel portions; and
    an upper and a lower sleeve configured within the opening,
    wherein sleeves extend rearward, flush or sub-flush, with the plane and substantially parallel to the orifice, and
    further wherein the upper sleeve and upper bezel portion are rearward of the respective lower sleeve and lower bezel portion.

6. The exhaust assembly according to claim 5, wherein the sleeves define a substantially cylindrical shield within the opening.

7. The exhaust assembly according to claim 5, wherein the rearmost portion of the sleeves has non-rounded edges.

8. The exhaust assembly according to claim 5, wherein the sleeves are integral with a heat shield surrounding the exhaust pipe.

9. An exhaust assembly, comprising:
    an exhaust pipe extending rearward from a vehicle;
    a fascia coupled to the vehicle;
    upper and lower bezels coupled to the fascia, comprising inner surfaces; and
    an upper and a lower sleeve substantially aligned with the pipe, tangentially contacting the inner surfaces,
    wherein the upper sleeve extends rearward and sub-flush with a line that is tangent to a rearmost surface of the upper bezel and perpendicular to the upper sleeve.

10. The exhaust assembly according to claim 9, wherein the bezels further define an exhaust plane, and further wherein the sleeves extend rearward and sub-flush with the exhaust plane.

11. The exhaust assembly according to claim 10, wherein the upper bezel is rearward of the lower bezel and the upper sleeve is rearward of the lower sleeve.

12. The exhaust assembly according to claim 9, wherein the end of the rearmost portion of each of the sleeves has non-rounded edges.

13. The exhaust assembly according to claim 9, wherein the sleeves are integral with a heat shield surrounding the exhaust pipe.

* * * * *